United States Patent [19]

Moore

[11] Patent Number: 4,924,094
[45] Date of Patent: May 8, 1990

[54] IMAGING APPARATUS

[75] Inventor: William T. Moore, Buckhurst Hill, United Kingdom

[73] Assignee: Rank Pullin Control Limited, Loughton, England

[21] Appl. No.: 27,978

[22] Filed: Mar. 19, 1987

[30] Foreign Application Priority Data

Mar. 20, 1986 [GB] United Kingdom ............... 8606876

[51] Int. Cl.$^5$ ............................................. G02B 26/10
[52] U.S. Cl. .................................... 250/334; 250/330; 358/113
[58] Field of Search ............... 250/334, 330; 358/107, 358/109, 113, 136–138; 364/571, 577, 518; 315/370, 382.1, 371, 368

[56] References Cited

U.S. PATENT DOCUMENTS

| | | | |
|---|---|---|---|
| 3,897,150 | 7/1975 | Bridges et al. | 358/107 X |
| 3,902,811 | 9/1975 | Altman et al. | 250/559 X |
| 4,106,845 | 8/1978 | Moore | 350/6.6 |
| 4,152,725 | 5/1979 | Beckmann | 358/109 |
| 4,396,952 | 8/1983 | Tisue et al. | 358/133 X |
| 4,450,836 | 5/1984 | Lehnert | 315/371 |
| 4,471,449 | 9/1984 | Leavitt et al. | 364/577 |
| 4,496,972 | 1/1985 | Lippmann et al. | 358/109 |
| 4,549,117 | 10/1985 | Takahashi et al. | 315/371 |
| 4,551,752 | 11/1985 | Wall et al. | 358/113 |
| 4,587,621 | 5/1986 | DuVall | 358/287 X |
| 4,630,111 | 12/1986 | Blam et al. | 358/109 |
| 4,654,876 | 3/1987 | Atkins | 358/109 X |
| 4,682,300 | 7/1987 | Seto et al. | 358/109 X |
| 4,689,526 | 8/1987 | Schweer | 315/317 |
| 4,695,964 | 9/1987 | Seto et al. | 358/109 X |
| 4,772,942 | 9/1988 | Tuck | 358/87 |

FOREIGN PATENT DOCUMENTS

| | | | |
|---|---|---|---|
| 0162123 | 11/1985 | European Pat. Off. | |
| 0066168 | 5/1979 | Japan | 358/109 |
| 0010221 | 1/1985 | Japan | |
| 83/01718 | 5/1983 | PCT Int'l Appl. | |
| 1580437 | 12/1980 | United Kingdom | 358/109 |
| 2149258 | 6/1985 | United Kingdom | 358/109 |

OTHER PUBLICATIONS

Patent Abstracts of Japan, vol. 9, No. 243 (P-392), [1986], Sep. 30th, 1985; & JP-A-60 95 682, (Toshiba K.K.), 29-05-1985.

IBM Journal of Research and Development, vol. 20, No. 1, Jan. 1976, pp. 40–57; R. Bernstein: "Digital Image Processing of Earth Observation Sensor Data".

Primary Examiner—Eugene R. LaRoche
Assistant Examiner—Seung Ham
Attorney, Agent, or Firm—Saidman, Sterne, Kessler & Goldstein

[57] ABSTRACT

Conventional scanners used in thermal imagers scan the image along curved lines rather than straight lines, resulting in image curvature in the display. The invention eliminates this by processing the video signal from the scanner to compose an output video signal which represents scanning along straight lines (18) across the image. The output signal is composed of a number of successive portions (A to F) each derived from a different line or lines of the video signal provided by the scanner.

5 Claims, 3 Drawing Sheets

IMAGING APPARATUS

This invention relates to imaging apparatus and is particularly, but not exclusively, concerned with thermal imaging apparatus.

Thermal imagers suffer from the problem that distortion of the reproduced image arises. The invention is aimed at eliminating or at least reducing image distortion in thermal or other imagers.

The invention is described by way of example with reference to the accompanying drawings, in which.

Figure 1:
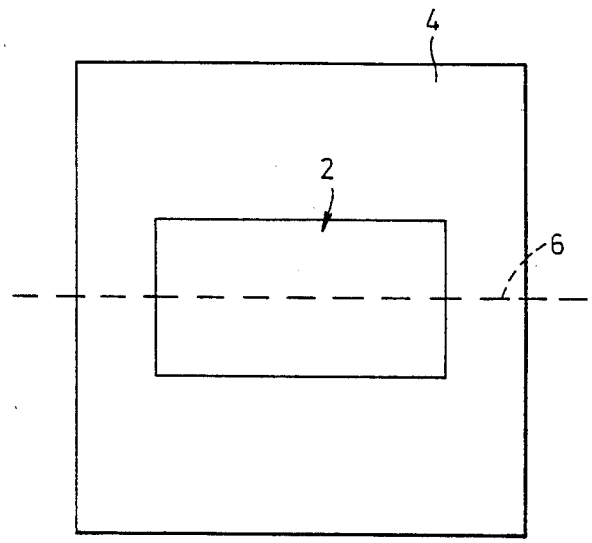
FIG. 1 illustrates a simple scene which may be comprised in the field of view of a thermal imager.

With reference to FIG. 1, a rectangular object 2 is shown as positioned approximately centrally in a field of view 4 of a conventional thermal imager. Horizontal broken line 6 divides the field of view 4 in half. The thermal imager includes a scanning mechanism for performing line and frame scans and may comprise, for example, twin coaxial rotating polygons or one rotating polygon for performing line scan and an oscillating mirror for performing frame scan. Energy from the scanner is directed to a thermally responsive detector whose output signals are processed and then applied to a CRT.

Figure 2:
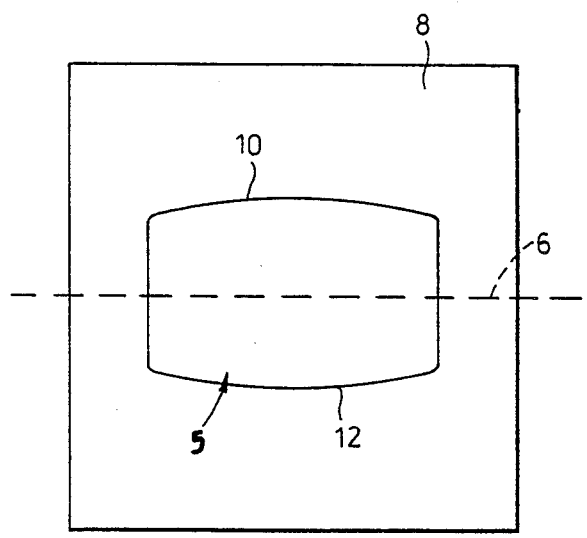
FIG. 2 illustrates image distortion which may arise in the scene of FIG. 1 when reproduced with the thermal imager.

Reference number 8 in FIG. 2 illustrates the face of the CRT with the image of object 2 reproduced on it as indicated at reference number 5. Horizontal broken line 6 again divides the field in half. As can be seen in FIG. 2, the upper and lower horizontal edges 10, 12 of the image 5 are distorted in that they are bowed outwardly. Such distortion arises from the nature of the conventional scanning mechanism and results in straightlines in the field of view being bowed upwardly in the upper part of the image and downwardly in the lower part of the image.

The aim of the invention is to reduce or eliminate such distortion.

Figure 3:
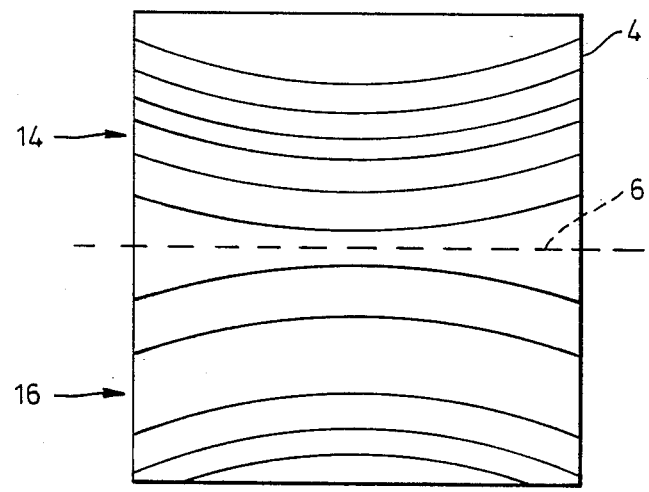
FIG. 3 illustrates the relationship between horizontal lines in the field of view of the thermal imager and the lines scanned by the scanning mechanism.

Although nominally the scanning mechanism performs a raster scan comprising a multiplicity of straight horizontal scan lines, in fact the scan lines are curved as illustrated in FIG. 3. Thus, in the half of the field of view above the centre line 6, the scan lines 14 are curved in the sense that the centre portions of the line dip relative to the end portions. In the portion of the field of view below the line 6 the scan lines 16 are curved in the opposite direction. The degree of curvature of the lines 14 and 16 increases with distance from the line 6, the scan line (not indicated separately) which coincides with the line 6 accordingly being straight. It is this curvature in the scan lines which produces the distortion illustrated in FIG. 2.

Figure 4:
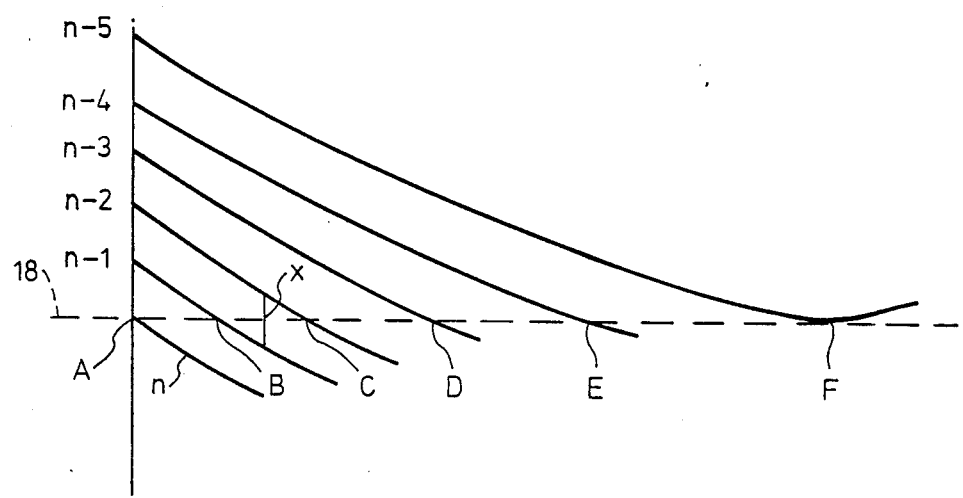
FIG. 4 is an enlarged view of part of FIG. 3.

As shown in FIG. 4, a horizontal line 18 across the field of view 4, in the upper portion thereof, is, as a consequence of the curvature of the scan lines, crossed by a multiplicity of scan lines. In the example shown in FIG. 4, six curved scan lines cross the horizontal line 18. Thus, scan line n is illustrated as starting at a point A coincident with the line 18 at the left-hand edge of the field of view. Scan lines n-1 to n-4 begin at the left-hand edge of the field of view at points above the line 18 and cross the line 18 at points B to E respectively. Scan line n-5 is illustrated as just touching the line 18 at point F halfway along the line 18. Thus, the signal representing the intensity of the pixels at each of the respective points A to F in line 18 is to be found in the respective scan lines n to n-5.

The present invention, in its preferred form provides a means whereby a signal for reproducing a straight horizontal line in the field of view as a straight horizontal line in the display is derived from a plurality of different scan lines in order to reduce or eliminate the distortion illustrated in FIG. 2. The signal for reproducing the straight line in the display may, for example, be composed by selecting in turn portions of the signals from scan lines n to n-5 corresponding to the points A to F respectively with, of course, corresponding selections being made for the remaining right-hand portion of line 18 which is not shown in FIG. 4. Alternatively or in addition the signal for display may be composed by obtaining signals corresponding to points along the line 18 positioned between points A and B, points B and C, points C and D etc. by interpolation. Thus, for example, a signal corresponding to a point X, which in the illustration, is mid-way between points B and C may be obtained as follows:

$$X = \tfrac{1}{2}(n-1) + \tfrac{1}{2}(n-2)$$

where n−1 and n−2 are the values of the signals obtained in scan lines n-1 and n-2 at the instant corresponding to point X along line 18. If the point X were located closer to point B than to point C then the proportion of the signal from scan line n-1 would be increased and the proportion of the signal from line n-2 correspondingly decreased and vice versa. Thus, as the point X moves towards the point B, the proportion of the signal from scan line n-2 which is taken will reduce to zero at point B.

Thus, in order to eliminate the distortion shown in FIG. 2, the signal to be displayed on each of the successive horizontal lines of the CRT is composed in the manner described with reference to line 18 illustrated in FIG. 4. The closer the line 18 is to the centreline 6, at which the scan line is straight, the greater will be the distance between points A, B, C etc. As a consequence, with such lines, it will be necessary to compose the signal to be displayed by interpolating as described in relation to point X in FIG. 4.

Figure 5:
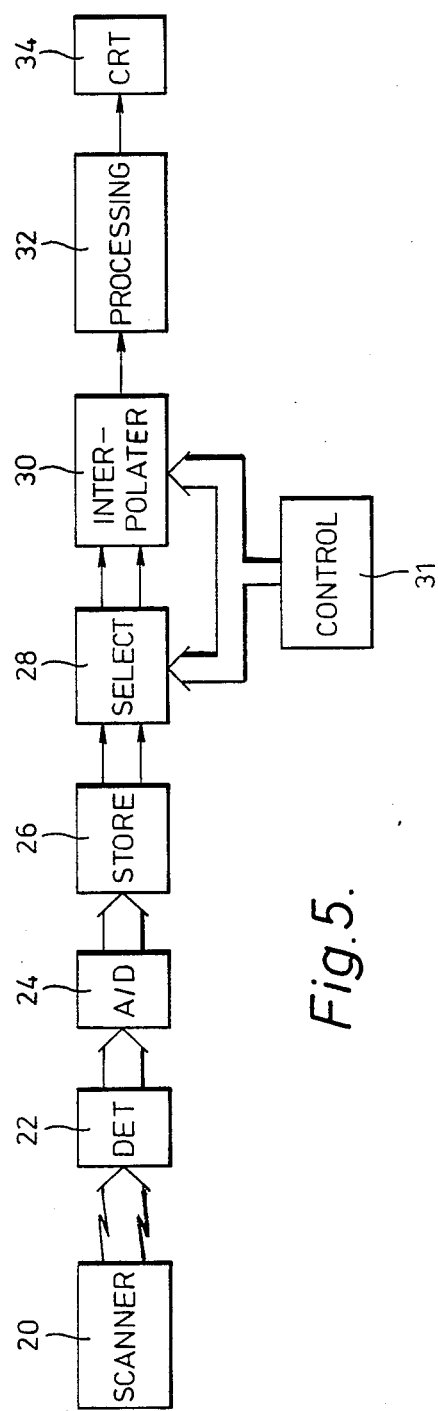
FIG. 5 is a simplified block diagram of an embodiment of the invention.

FIG. 5 illustrates a simplified block diagram of thermal imaging apparatus in accordance with a preferred embodiment of the invention. The apparatus comprises a scanner 20 which, for example, may be a twin polygon coaxial scanner or a scanner comprising a single polygon and an oscillating mirror, a detector array 22, for example comprising an array of eight sprite detectors, an analog-to-digital converter 24 which digitizes the signals from the detectors and a store 26 which receives and stores signals from the converter 24. The store 26 should have capacity for storing a multiplicity of lines and it may, for example, be of sufficient capacity to store one or more frames.

In accordance with the preferred embodiment of the invention, a selector circuit 28 is operable for reading out from the store 26 signals from two lines simultaneously and supplying them to an interpolator 30. The selector 28 is further operable to switch between different lines in the store 26 during each line period. The selector 28 and interpolator 30 are controlled by a control circuit 31 preferably comprising a microprocessor which is arranged to cause the selector 28 and interpolator 30 to compose a signal for each individual line to be displayed in the manner described with reference to FIG. 4. The interpolator outputs the composed signal to circuitry 32 which performs further processing as necessary and converts the signal to analog form for supply to a cathode ray tube 34 which displays the image.

Thus, in this way the distortion illustrated in FIG. 2 may be reduced or eliminated.

Various modifications are possible within the scope of the invention. For example, although the embodiment illustrated performs interpolation based upon two adjacent lines, it is possible within the scope of the invention to obtain an improved interpolation using more than two lines, for example where the strength of the video signal does not alter in a completely linear manner from line to line. This will, for example, be the case where a region of uniform signal in the seen abuts the a region of altering signal due, for example, to the edge of an object. Improved interpolation may be achieved in such a situation by utilizing more than two lines. For example, four scan lines might be used for the interpolation. In this instance interpolation may, by way of example, be as follows, for a point X midway between points B and C:

$$X = \tfrac{5}{8}(n-1) + \tfrac{5}{8}(n-2)\tfrac{1}{8}(n)1 - \tfrac{1}{8}(n-3)$$

Although in the illustrated embodiment, the interpolation has been performed digitally, it may alternatively be performed on the signals when in analogue form.

Although the scanner 20 diagrammatically represented in FIG. 5 has not been illustrated in detail because it may be of conventional construction, reference may be made to U.S. Pat. No. 4,106,845 for an example of a scanner utilising a polygonal mirror for line scanning and an oscillating mirror for frame scanning. The invention may particularly advantageously be applied to the processing of signals derived from a scanner as illustrated in this U.S. Patent. An alternative form of scanner with which the invention may be employed utilises two coaxial rotating polygonal mirrors for effecting both line and frame scanning such as described in British Pat. No. 2,110,897. As has been explained above, the detector array 22 illustrated diagrammatically in FIG. 5 may comprise so-called "sprite" detectors. Such detectors are commercially available but a description of them may be found in British Pat. No. 1,488,258.

Although the invention has been described and illustrated so far in apparatus terms, it is to be understood that the invention also resides in a method of producing images, particularly images from thermal radiation, in which image signals are processed for eliminating or reducing curvature errors.

I claim:

1. Imaging apparatus comprising an optical scanner for scanning a field of view with a plurality of curved line scans, a detector for producing first image signals each corresponding to a respective one of said curved line scans, and signal processing means for processing the first image signals to produce therefrom second image signals, each of at least a plurality of said second image signals being derived from a plurality of said first image signals such that the extent to which a particular first image signal contributes to a particular second image signal of said plurality of second image signals varies between different portions of said particular second image signal such that said particular second image signal represents a substantially straight line across said field of view intersecting a plurality of said curved line scans.

2. Apparatus according to claim 1, wherein said signal processing means produces successive portions of each of said at least a plurality of second image signals utilizing successive ones of said first image signals.

3. Apparatus according to claim 2, wherein said signal processing means produces said successive portions by interpolation from successive groups of said first image signals.

4. Apparatus according to claim 3, wherein each group is a pair of said first image signals.

5. Apparatus according to claim 1, wherein said optical scanner and said detector are arranged for producing said first image signals from thermal radiation.

* * * * *